Patented Mar. 1, 1932

1,847,837

UNITED STATES PATENT OFFICE

JULIUS KLÖPPER, OF MULHEIM-RUHR, GERMANY, ASSIGNOR TO THE FIRM VEREINIGTE STAHLWERKE AKTIENGESELLSCHAFT, OF DUSSELDORF, GERMANY

METHOD OF CONNECTING PIPES

Application filed October 10, 1930, Serial No. 487,852, and in Germany November 26, 1929.

This invention relates to a method of connecting pipes.

Welded pipe joints are known in which the free end of the socket is turned down over a flange, double ridge or hollow flange and is welded thereto. In this method the welding seam is situated immediately on the flange and on the barrel of the pipe.

In spite of the fact that in this type of joint the welded seam is relieved of stress, to a fairly satisfactory extent, it is nevertheless possible that, in specially unfavourable circumstances, certain slight stresses are set up in the welded seam.

Figure 1:
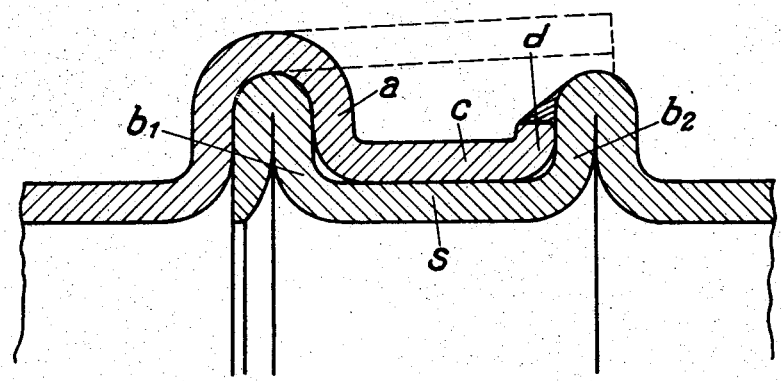
Figure 2:
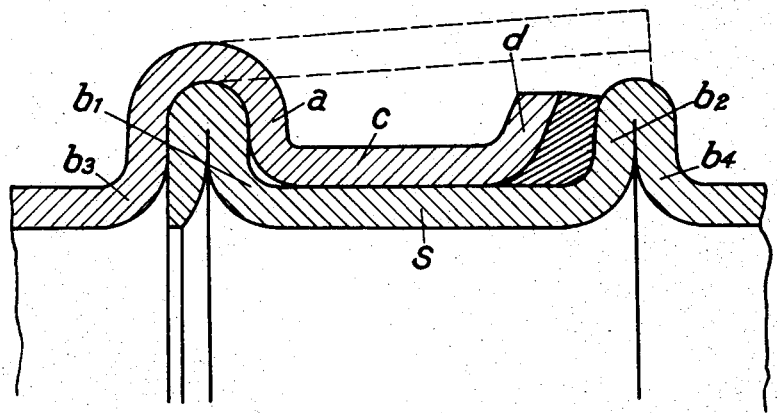

The present invention aims at obviating any possibility of this kind from the outset, and provides a process for connecting tubes in which the free end of the overlapping socket is constricted into an annular channel of U-shape formed between two successive flanges, double ridges or hollow flanges provided on the end of the pipe barrel, and is tightly connected at its expanded end, with the second flange, double ridge or hollow flange. Fig. 1 represents an embodiment of the invention. Fig. 2 shows a modified form thereof.

In this case the constricting is not effected directly by hammering but with the aid of a suitable swage or by rolling, the deformation of the work being effected without damaging it, that is to say, the stress to which the work is subjected is relatively small.

As can be seen from the figures which represent two typical embodiments of the invention, the result of constricting the end of the socket on to the troughs of the annular channel (formed in the pipe barrel) while in the red hot state is that the part $a$ of the resulting ridge shrinks tightly round the flange, double ridge or hollow flange $b'$, and the part $c$ also shrinks tightly on to the barrel $s$. The shrinkage takes place naturally in cooling. In conformity with the shape of the annular channel, the end portion $d$ of the constriction turns outwards. The sole purpose of the weld seam (Fig. 1), which connects the upturned end $d$ with the second flange, double ridge or hollow flange $b^2$, is to assure the necessary tightness of the joint.

The tightness can also be obtained with other packing media, such as lead, rubber or the like (Fig. 2) by shaping the expanded end $d$ accordingly.

This connection is extremely secure, before the packing sustains any stress, the flange, double ridge or hollow flange $b'$ and the surrounding portion $a$ of the constriction would have first to be drawn out to the full, for example by the most powerful tractive effort, and, in addition the shrinkage pressure acting on the pipe barrel would have to be overcome.

The elasticity of the connection is extensively assured inasmuch as the socket engaging round the flange, double ridge or hollow flange $b'$, and also the second flange, double ridge or hollow flange $b^2$ and their inward bends $b^3$, $b^4$ allow of a considerable elastic deformation.

Claims:

1. A method of connecting pipes, which comprises constricting the free end of the overlapping socket into an annular channel formed between two successively disposed flanges, double ridges or hollow flanges provided on the inserted end of the pipe barrel, the expanded end of the socket being connected tightly with the second flange, double ridge or hollow flange.

2. A pipe connection, in which the free end of the overlapping socket is constricted into an annular channel formed between two successive flanges, double ridges or hollow flanges provided on the inserted end of the pipe barrel, the expanded end of the socket being connected tightly with the second flange, double ridge or hollow flange.

In testimony whereof I affix my signature.

JULIUS KLÖPPER.